Nov. 3, 1925.

J. W. SCHWEITZER

NUTCRACKER

Filed July 14, 1923

1,560,349

John W. Schweitzer
INVENTOR

BY Victor J. Evans
ATTORNEY

Patented Nov. 3, 1925.

1,560,349

UNITED STATES PATENT OFFICE.

JOHN W. SCHWEITZER, OF CHICAGO, ILLINOIS.

NUTCRACKER.

Application filed July 14, 1923. Serial No. 651,550.

*To all whom it may concern:*

Be it known that I, JOHN W. SCHWEITZER, a citizen of the United States, residing at Chicago, in the county of Cook and State of Illinois, have invented new and useful Improvements in Nutcrackers, of which the following is a specification.

This invention relates to a nut cracker and has for its primary object the construction of a nut cracker that is of ornamental design and which may be very easily operated.

An object of the invention is the novel construction of nut cracker whereby the nuts may be cracked with very little effort and the refuse properly collected.

A feature of my invention is the novel manner of associating the parts so that the proper leverage can be accomplished for cracking nuts with very little effort in combination with a dish that will receive the refuse.

With these and other objects in view the invention will be better understood from the following detailed description taken in connection with the accompanying drawing wherein.

Figure 1:
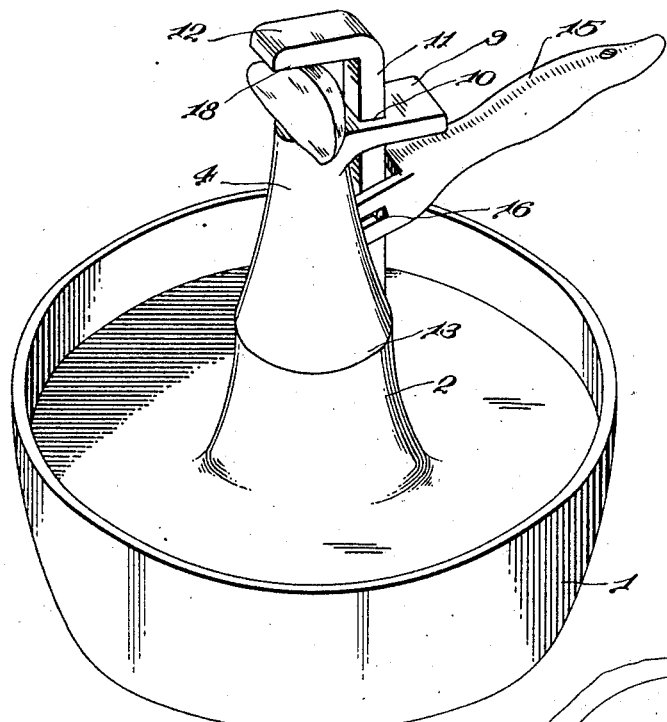
Fig. 1 is a perspective view of the nut cracker.
Figure 3:
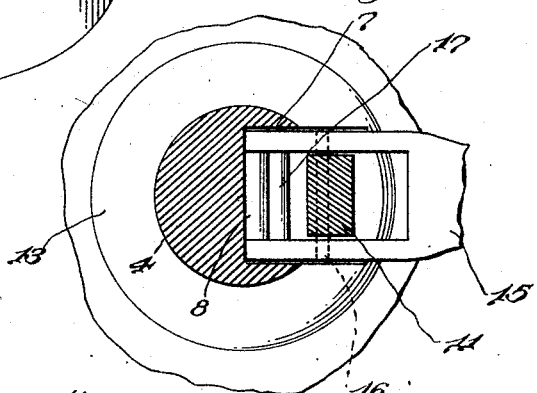
Fig. 3 is a sectional view on the line 3—3 of Fig. 2.
Figure 2:
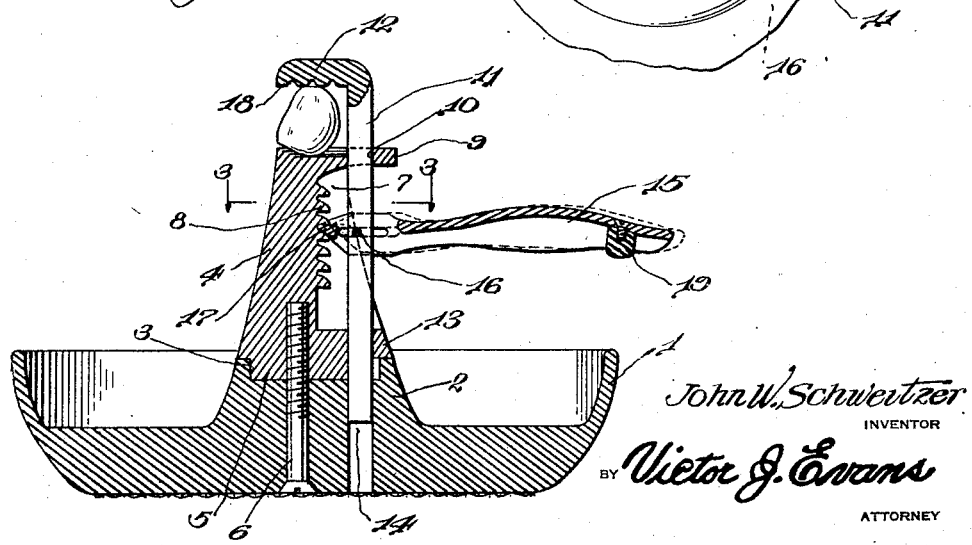
Fig. 2 is a vertical sectional view.

Again referring to the drawing illustrating one of the many constructions of my invention the numeral 1 designates a dish of any suitable ornamentation having a centrally arranged support 2 upstanding therefrom in which is arranged a circular depression 3. My improved nut cracking device consists of a stationary jaw 4 that rests upon the support and has a projection 5 seated in the depression 3. A screw 6 binds the jaw member to the support. This stationary jaw member has recesses as indicated at 7 in which is arranged the vertical series of teeth 8. This jaw is further provided with an extension 9 having an opening 10 in which is slidably mounted the shank 11 of the movable jaw 12. It will be noted that the lower end of the shank 11 is slidably mounted in the base 13 of the stationary jaw and in the passage 14 in the support thereby assuring a substantial mounting of the slidable jaw. This vertical sliding action of the jaw enables same to be readily dropped into engagement with the nut thereby quickly accommodating different size nuts. The handle 15 has a pin and slot connection 16 with the shank 11 and is further provided with a dog 17 for adjustable connection with the teeth 8. Thus it will be seen that the handle may be slid horizontally to completely disengage the dog from the teeth to allow the movable jaw to readily drop into engagement with the nut. The handle then can be immediately moved forward to bring into engagement the dog with the teeth and thus the handle rocked to provide the proper pressure upon the nut to crack the same. It will be noted that both jaws are serrated to properly grip the nut and the movable jaw is further provided with a cutter 18 which enables the jaw to readily chip the nut by holding the nut on the edge of the lower jaw and work the handle back and forth to force the cutter over the surface of the nut.

To complete the invention I mount a resilient bumper 19 on the handle for striking engagement on the upper edge of the dish.

From the foregoing description taken in connection with the accompanying drawing it will be apparent that I provide a very simple substantial nut cracker that may be very easily operated and which will provide proper pressure with very little effort upon the part of the operator.

It will also be noted that each individual part is of simple construction and may be readily connected and disconnected.

It is, of course, to be understood that the various parts may be constructed, shaped, and assembled in other manners than illustrated and described, therefore, I do not desire to be limited in any manner except as set forth in the claim hereunto appended.

Having thus described my invention what I claim is:

A nut cracker comprising a dish, a support upstanding from the bottom of the dish formed with a depression, a jaw member resting on said support and having a projection arranged in the depression, a screw securing the jaw to the support, a second jaw having a shank slidably supported by said first jaw, a handle having a pin and slot connection with the second jaw, and a vertical series of teeth on the first jaw coacting with said handle for giving movement to the second jaw relative to the first jaw.

In testimony whereof I affix my signature.

JOHN W. SCHWEITZER.